May 22, 1945.   L. A. KILGORE   2,376,781
IMPULSE GENERATOR
Original Filed July 19, 1940

WITNESSES:

INVENTOR
Lee A. Kilgore.
BY
ATTORNEY

Patented May 22, 1945

2,376,781

UNITED STATES PATENT OFFICE 2,376,781

IMPULSE GENERATOR

Lee A. Kilgore, Forest Hills, Pa., assignor to Westinghouse Electric & Manufacturing Company, East Pittsburgh, Pa., a corporation of Pennsylvania Original application July 19, 1940, Serial No. 346,246. Divided and this application July 20, 1943, Serial No. 495,410

7 Claims. (Cl. 171—252)

My invention relates to a vapor electric device and particularly to a control system for applying make-alive impulses to the make-alive electrodes of vapor electric valves.

This is a division of my application filed July 19, 1940, Serial No. 346,246, and assigned to the assignee of this invention, which has matured into U. S. Patent No. 2,340,059, on January 25, 1944.

In the operation of vapor electric converters of the make-alive type, it has heretofore been customary to utilize auxiliary thermionic valves or mechanical switching devices to apply the necessary periodic impulses for initiating the conducting intervals in the valves. The heretofore known impulsing systems have had the disadvantages in that the thermionic control valves were of short life and required periodic replacement to secure satisfactory operation of the converter and the mechanical switching devices frequently burned out the contacts or otherwise became disarranged.

In the control system according to my invention the periodic impulses are supplied by means of an impulse generator of the dynamo-electric type having a special winding arrangement for producing impulse currents having high narrow positive impulses or so-called peaked wave impulses and a relatively low long-time negative impulse or so-called flat wave form. This distorted wave form is secured by providing an exciting or field element having a very narrow exciting pole and a wide return pole surface. The winding for producing the impulse is also of a special form having one side of all of the windings concentrated in a single winding slot and the opposite sides of the windings distributed in a plurality of slots to produce the desired wave form as described. The impulse generator is driven at synchronous speed by any suitable motor preferably of the synchronous type.

It is accordingly an object of my invention to produce an impulse generator providing a distorted wave form.

It is a further object of my invention to provide a control system in which the distorted wave form of my impulse generator is applied to control a make-alive type converter.

Figure 1:
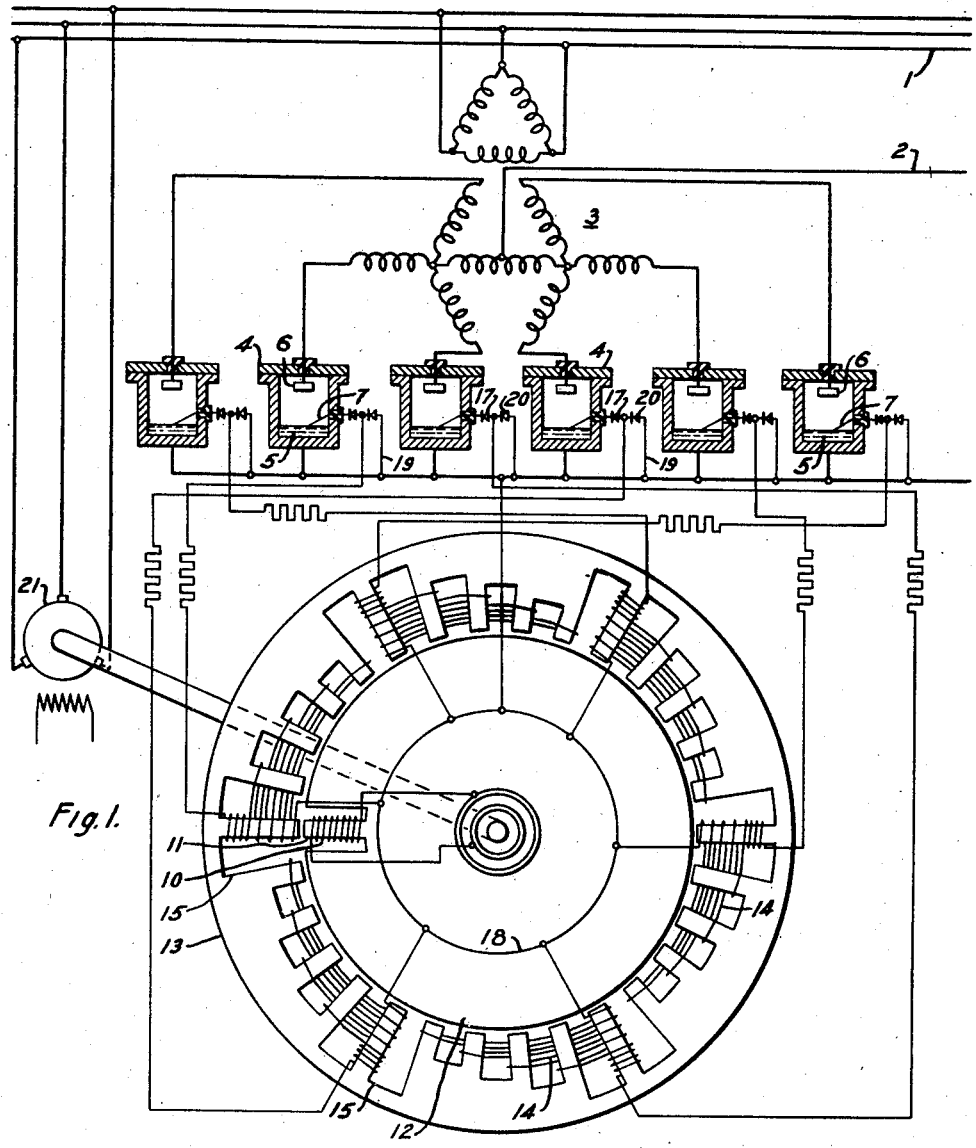
Figure 2:
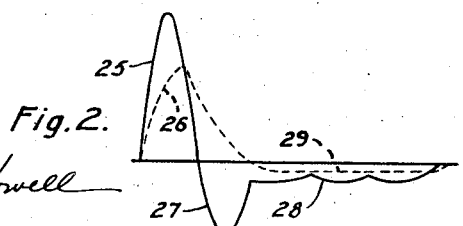

Other objects and advantages of my invention will be apparent from the following detailed description taken in conjunction with the accompanying drawing in which:

Figure 1 is a schematic illustration of a vapor electric converter utilizing my invention, and Fig. 2 is a diagrammatic illustration of the current and voltage waves produced by my improved control system.

In the exemplary embodiment of my invention, an alternating current circuit 1 and direct current circuit 2 are connected by means of a suitable transformer 3, the flow of current through the transformer 3 being controlled by the make-alive type valves 4, each of the valves 4 including a vaporizable cathode 5 of suitable material such as mercury, a cooperating anode 6 and a make-alive electrode 7.

The impulse generator according to my invention comprises a field member having a concentrated field winding 10 associated with a relatively narrow-faced pole element 11 and a relatively large-faced pole return 12. The armature 13 of the impulse generator carries a plurality of star connected sections 14 preferably at least as great in number as the make-alive electrode 7 to be operated. Each impulse generating section 14 comprises a winding distributed over a sector of the armature surface and comprises a plurality of winding turns, one side of all of the turns of the windings being concentrated preferably in a single armature slot 15 or at least so grouped that all turns are substantially simultaneously subject to the flux from the narrow pole face 11 and the opposite sides of these turns being distributed throughout a plurality of slots. Preferably approximately half of the return turns are located in a single slot while the remaining turns are distributed evenly throughout a plurality of slots. The phase terminals of the windings 14 are connected to the several make-alive electrodes 7 preferably through suitable unidirectional conductors 17 while the star point 18 of the windings 14 are connected to the cathodes 5 of the valves 4. Preferably a return or shunt connection 19 is provided for the inverse impulse wave. A suitable unidirectional conductor 20 is provided in the shunt connection 19.

A suitable driving motor 21 is provided for rotating the impulse generator in synchronism with the impulses applied to the anodes 6 of the make-alive type valves 4. Preferably a motor of the synchronous type is utilized which may be connected to any suitable in-phase source such as the alternating current circuit 1.

In the operation of the control system according to my invention, the impulse generator is rotated at synchronous speed so that the concentrated pole 11 successively energizes the various armature windings 14. Thus when the concentrated flux from the pole 11 cuts the one side of the windings, a sharp voltage impulse 25 is generated. This impulse 25 produces a current impulse 26 also of rapidly rising characteristic and at the end of the impulse period it is desirable to reduce the impulse 26 rapidly to a very low value. This is accomplished as the exciting pole 11 passes approximately half of the return turns of the impulse winding 14, thus producing a rapidly decreasing negative peak 27 of potential, and as the impedance of the circuit is considerable the current 24 is rapidly reduced to zero. As the exciting pole 11 passes the successive distributed return turns, a relatively low inverse potential 28 is produced which produces a relatively low inverse current 29 extending over a considerable interval of time. The unidirectional conductor 17 in series with the make-alive electrode 7 permits the peak potential of the positive impulse 25 to be applied to the make-alive electrode 8 and blocks the inverse potential 27 which flows through the return circuit 19 and its associated unidirectional conductor 20.

While for purposes of illustration I have shown and described a specific embodiment of my invention, it will be apparent that changes and modifications can be made therein without departing from the true spirit of my invention or the scope of the appended claims.

I claim as my invention:

1. An impulse generator comprising a field member having one pole face of a few electrical degrees extent and a second pole face of 360 minus a few electrical degrees extent, an armature comprising a plurality of star connected sections, each section having a plurality of winding slots and a winding composed of a plurality of winding turns, one side of each of said turns being positioned in one of said slots and the opposite sides of said turns being distributed throughout a plurality of said slots.

2. An impulse generator comprising a field member including a pair of pole faces shaped to effect a substantially greater flux density at one of said pole faces than at the other, and an armature member, one of said members being rotatable and the other being stationary, said armature including a winding having a plurality of turns with the front sides of said turns being grouped to cut the flux lines at said one pole face substantially simultaneously and the opposite sides being distributed to cut the flux lines at said one pole face other than simultaneously.

3. An impulse generator comprising a field member including a pair of pole faces covering 360 electrical degrees with one pole face extending over but a few degrees and the other extending over the remainder of the 360 degrees to effect a substantially greater flux density at said one pole face than at said other pole face, and an armature member, one of said members being rotatable and the other being stationary, said armature including a winding having a plurality of turns with the front sides of said turns being grouped to cut the flux lines at said one pole face substantially simultaneously and the opposite sides being distributed to cut the flux lines at said one pole face other than simultaneously.

4. An impulse generator comprising a field member including a pair of pole faces covering 360 electrical degrees with one pole face extending over substantially less than 180 degrees and the other pole face extending over substantially more than 180 degrees to effect a substantially greater flux density at said one pole face than at the other, and an armature having a plurality of winding slots and a winding comprising a plurality of winding turns with one side of each of said turns being positioned in one of said slots and the opposite sides of said turns being distributed among a plurality of said slots.

5. An impulse generator comprising a field member including a pair of pole faces covering 360 electrical degrees with one pole face extending over substantially less than 180 degrees and the other pole face extending over substantially more than 180 degrees to effect a substantially greater flux density at said one pole face than at the other, and an armature having a plurality of winding slots and a winding comprising a plurality of winding turns, one side of each of said turns being positioned in one of said slots and the opposite sides of approximately one-half of said turns being positioned in another of said slots with the opposite sides of the other half of said turns being distributed among a plurality of the remaining slots.

6. An impulse generator comprising a field member including a pair of pole faces covering 360 electrical degrees with one pole face extending over but a few degrees and the other extending over the remainder of the 360 degrees to effect a substantially greater flux density at said one pole face than at the other pole face, and an armature member, one of said members being rotatable and the other being stationary, said armature having a plurality of winding slots and a winding comprising a plurality of winding turns with one side of each of said turns being positioned in one of said slots and the opposite sides of approximately one-half of said turns being positioned in a second slot following said one slot in the order of movement of said slots relative to a point on said field member with the opposite sides of the other half of said turns being distributed in equal numbers among a plurality of the remaining slots.

7. An impulse generator comprising a field member including a pair of pole faces covering 360 electrical degrees with one pole face extending over but a few degrees and the other extending over the remainder of the 360 degrees to effect a substantially greater flux density at said one pole face than at the other pole face, and an armature comprising a plurality of star connected sections, each section having a plurality of winding slots and a winding comprising a plurality of winding turns with one side of each of said turns being positioned in one of said slots and the opposite sides of approximately one-half of said turns being positioned in another of said slots with the opposite sides of the other half of said turns being distributed among a plurality of the remaining slots in the section.

LEE A. KILGORE.